United States Patent [19]

Braun

[11] Patent Number: 5,850,292
[45] Date of Patent: Dec. 15, 1998

[54] WAVELENGTH MONITOR FOR OPTICAL SIGNALS

[75] Inventor: David M. Braun, Santa Rosa, Calif.

[73] Assignee: Hewlett-Packard Company, Palo Alto, Calif.

[21] Appl. No.: 969,812

[22] Filed: Nov. 13, 1997

[51] Int. Cl.[6] ....................................................... G01J 3/51
[52] U.S. Cl. ........................................... 356/419; 250/226
[58] Field of Search .................................... 356/319, 326, 356/328, 416, 419; 250/226

[56] References Cited

U.S. PATENT DOCUMENTS

| | | |
|---|---|---|
| 4,244,045 | 1/1981 | Nosu et al. . |
| 4,768,849 | 9/1988 | Hicks, Jr. . |
| 5,583,683 | 12/1996 | Scobey . |
| 5,617,234 | 4/1997 | Koga et al. ............................. 359/131 |

*Primary Examiner*—F. L. Evans
*Attorney, Agent, or Firm*—John L. Imperato

[57] ABSTRACT

A wavelength monitor detects wavelength drifts of component channel signals within multi-wavelength light signals. Multiwavelength light incident on the wavelength monitor is cascaded along a multipoint travel path. Within the travel path, the component channel signals are incident on a series of wavelength discriminators arranged on an optically transmissive member. Each wavelength discriminator is selectively transmissive to a predetermined one of the channel signals and is reflective to the remaining component channel signals of the multi-wavelength light signal. According to a first preferred embodiment of the present invention, the optical transmission through each wavelength discriminator varies monotonically according to variations in the wavelength of the predetermined channel signal. Each selectively transmitted channel signal is intercepted by a detector which produces an output current that is mapped to corresponding signal wavelengths. According to a second preferred embodiment of the present invention, the wavelength discriminator includes a dispersive element that maps the applied channel signal to spatial locations dependent upon the signal wavelength. The dispersed signal is intercepted by a split-detector responsive to the spatial location of the dispersed signal. The output currents produced by the split-detector are used to monitor wavelength deviations of the incident channel signal from the predefined channel wavelength.

10 Claims, 4 Drawing Sheets

WAVELENGTH MONITOR FOR OPTICAL SIGNALS

FIELD OF THE INVENTION

The present invention relates to wavelength monitoring of multi-wavelength light signals in optical telecommunication systems.

BACKGROUND OF THE INVENTION

High data rates are achieved in optical telecommunication systems using dense wavelength division multiplexed (DWDM) signals. DWDM signals are multi-wavelength light signals containing multiple channel signals each at a predefined channel wavelength. In a typical optical telecommunication system the channel signals are generated by a series of modulated transmitters and the channel signals may be separated by 25 GHz to 200 GHz within the 1528 to 1565 nanometer wavelength range defined by the flat gain region of erbium doped fiber amplifiers (EDFAs), a critical component of modern optical telecommunication systems. Performance of an optical telecommunication system can be verified by monitoring wavelength, power and signal-to-noise ratio of each of the DWDM channel signals. Wavelength monitoring of the channel signals assures that deviations from the predefined channel wavelengths due to drifts or instabilities in the transmitters are detected. Wavelength monitoring also verifies that channel signals subsequently added to the multiwavelength light signal are within specified wavelength deviations of the channel signals predefined channel wavelengths. While wavelength monitoring can be performed using optical spectrum analyzers (OSAs), OSAs that include motors to rotate optical gratings or optical filter elements may be too large to be integrated within an optical telecommunication system. OSAs based on InGaAs/InP photodetector arrays have small physical size, but they are expensive to manufacture, making it economically unfeasible to incorporate this type of OSA into an optical telecommunication system. Other optical measurement instruments such as multi-wavelength meters can be used to monitor wavelength of channel signals, but these types of instruments are physically large and expensive to manufacture. Scobey in U.S.P.N. 5,583,683 teaches a low-cost, physically compact, optical multiplexing device for monitoring power of DWDM channel signals, but the device doesn't provide for wavelength monitoring of the channel signals. Accordingly, there is a need for a physically-compact wavelength monitor that is inexpensive to manufacture.

SUMMARY OF THE INVENTION

A wavelength monitor constructed in accordance with the preferred embodiments of the present invention, has compact size and is inexpensive to manufacture. The wavelength monitor is readily integrated into an optical telecommunication system for monitoring wavelength deviations of component channel signals within a multi-wavelength light signal, such as a dense wavelength division multiplexed (DWDM) signal. The wavelength monitor receives the multi-wavelength light signal and cascades the signal along a multipoint travel path. Within the travel path, the component channel signals are incident on a series of wavelength discriminators arranged on an optically transmissive member. Each wavelength discriminator selectively transmits a predetermined one of the channel signals and reflects the remaining component channel signals of the multi-wavelength light signal. According to a first preferred embodiment of the present invention, the wavelength monitor includes wavelength discriminators that each have optical transmission that varies monotonically according to wavelength variations of a component channel signal. Each selectively transmitted channel signal is intercepted by a detector which produces an output current in response to the strength of the intercepted signal. The output current is mapped to corresponding signal wavelengths and is used to monitor the wavelength of the component channel signals. According to a second preferred embodiment of the present invention, each wavelength discriminator within the wavelength monitor includes a dispersive element that maps the wavelength of an applied channel signal to a corresponding spatial location on a split-detector. The split-detector produces output currents that are used to monitor wavelength deviations of the component channel signal from the predefined channel wavelength.

DETAILED DESCRIPTION OF THE PREFERRED EMBODIMENT

Figure 1:
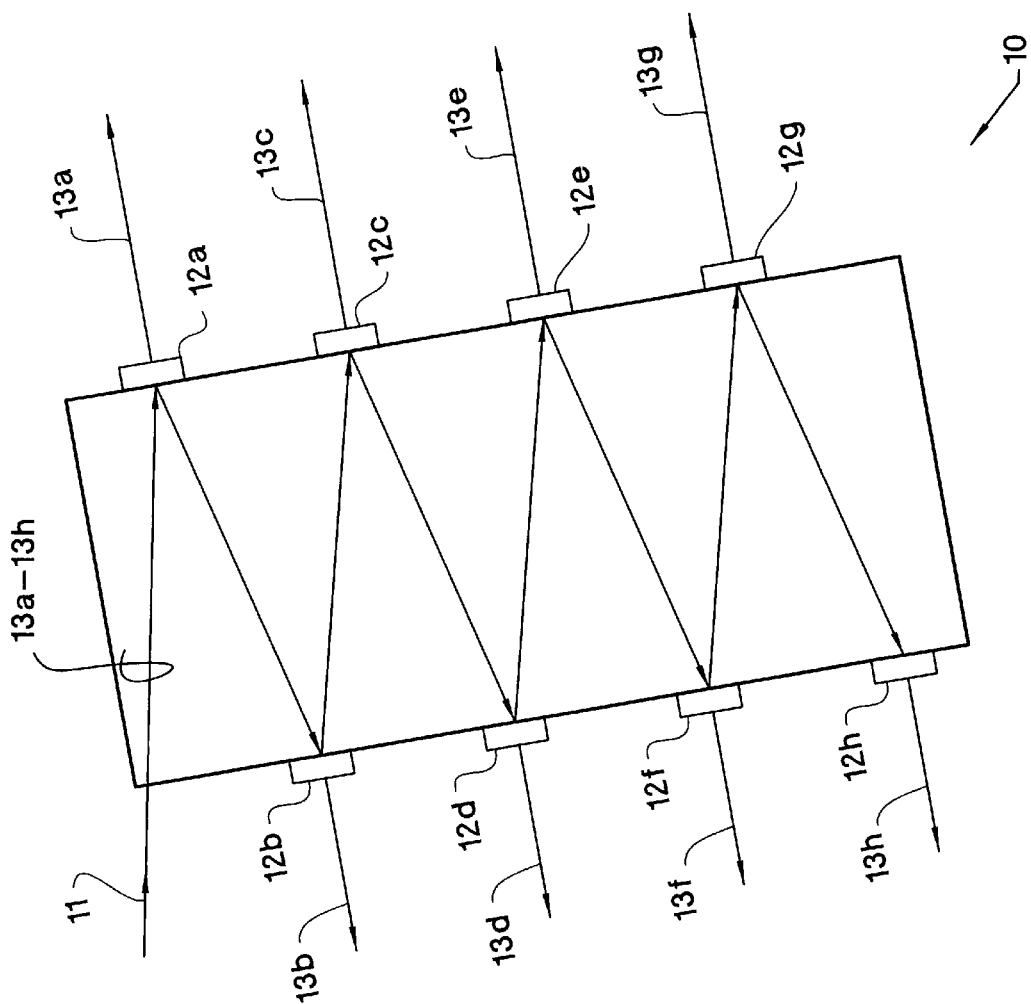
FIG. 1 shows a prior art optical multiplexing device.

FIG. 1 shows a prior art optical multiplexing device 10 disclosed by Scobey in U.S.P.N. 5,583,683. An incident multi-wavelength optical signal 11 is cascaded along a travel path in a zigzag pattern and is incident on multiple ports 12a–12h of the optical multiplexing device 10. Each of the multiple ports 12a–12h is transparent to a wavelength band containing one of the optical signals within the multi-wavelength optical signal 11 and is reflective to the other optical signals within the multi-wavelength optical signal 11. The optical transparency of the ports 12a–12h enables each component optical signal of the multi-wavelength optical signal 11 to be isolated at a separate one of the ports 12a–12h . Once each channel signal 13a–13h is isolated, power measurements of each of the optical signals 13a–13h are readily obtained using a detector or optical power meter. While Scobey's optical multiplexing device 10 provides for power measurements of the component optical signals 13a–13h , the device 10 doesn't provide for monitoring wavelength of the component channel signals 13a–13h of the multi-wavelength optical signal 11. An alternate type of optical demultiplexer taught by Nosu et al., in U.S.P.N. 4,244,045, also cascades multi-wavelength light in a zigzag pattern between multiple ports.

Figure 2:
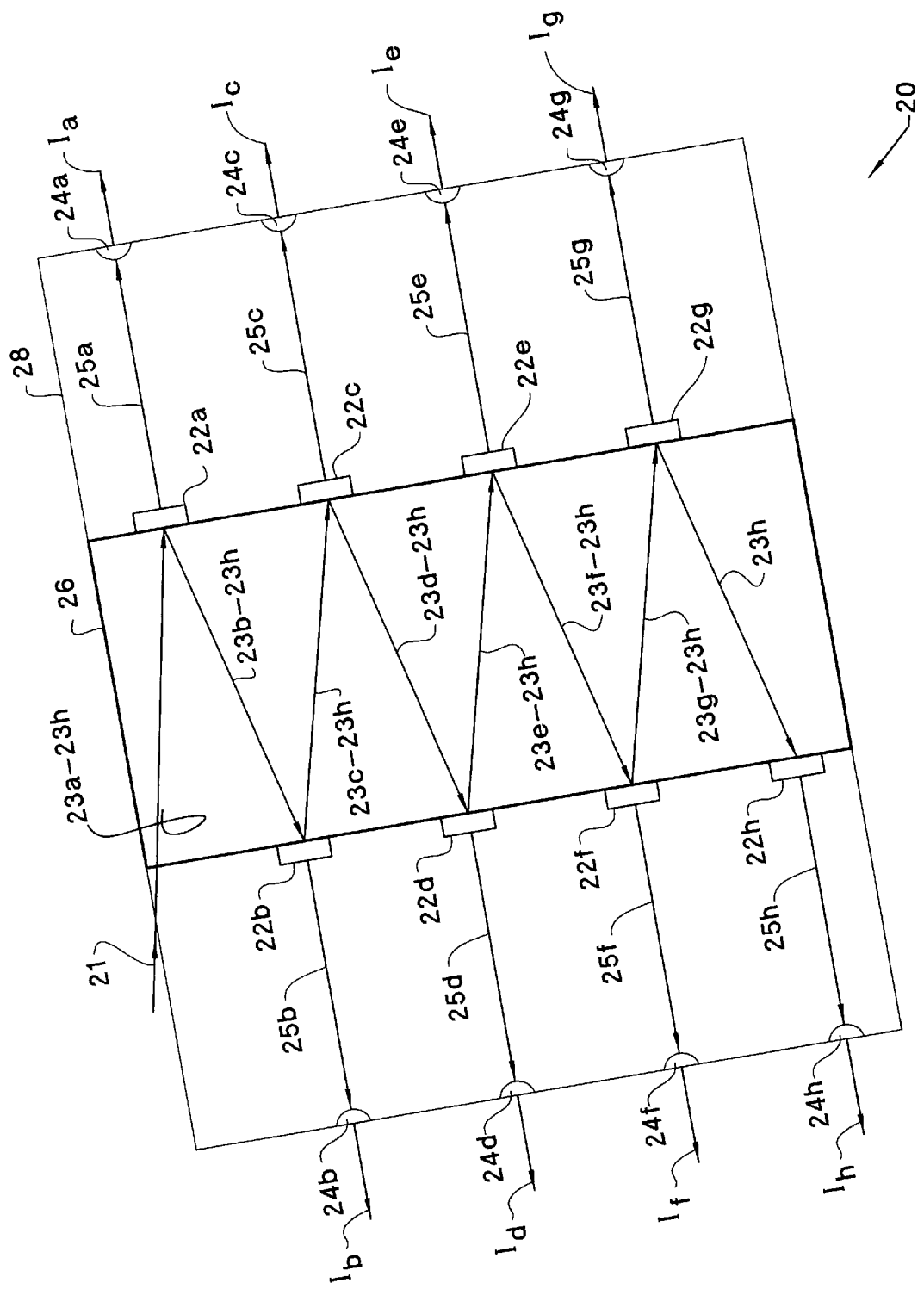
FIG. 2 shows an optical wavelength monitor constructed according to the preferred embodiments of the present invention.

FIG. 2 shows an optical wavelength monitor 20 constructed according to the preferred embodiments of the present invention. An incident multi-wavelength light signal 21, such as a DWDM signal, is cascaded along a multipoint travel path in a zigzag pattern through an optically transmissive member 26. Component light signals, or channel signals 23a–23h of the multi-wavelength signal 21 are incident on a series of wavelength discriminators 22a–22h arranged on the optically transmissive member 26. As shown, the optically transmissive member 26 is a block. Alternatively, the optically transmissive member 26 is a mounting frame that positions the wavelength discriminators 22a–22h so that the multi-wavelength light signal 21 propagates through the air or other ambient medium between successive wavelength discriminators 22a–22h. Each wavelength discriminator 22a–22h is not optically transparent, but rather, is selectively transmissive to light signals within a predetermined wavelength range containing a predetermined one of the channel signals 23x while being reflective to the remaining component channel signals within the multi-wavelength light signal 21.

Figure 3:
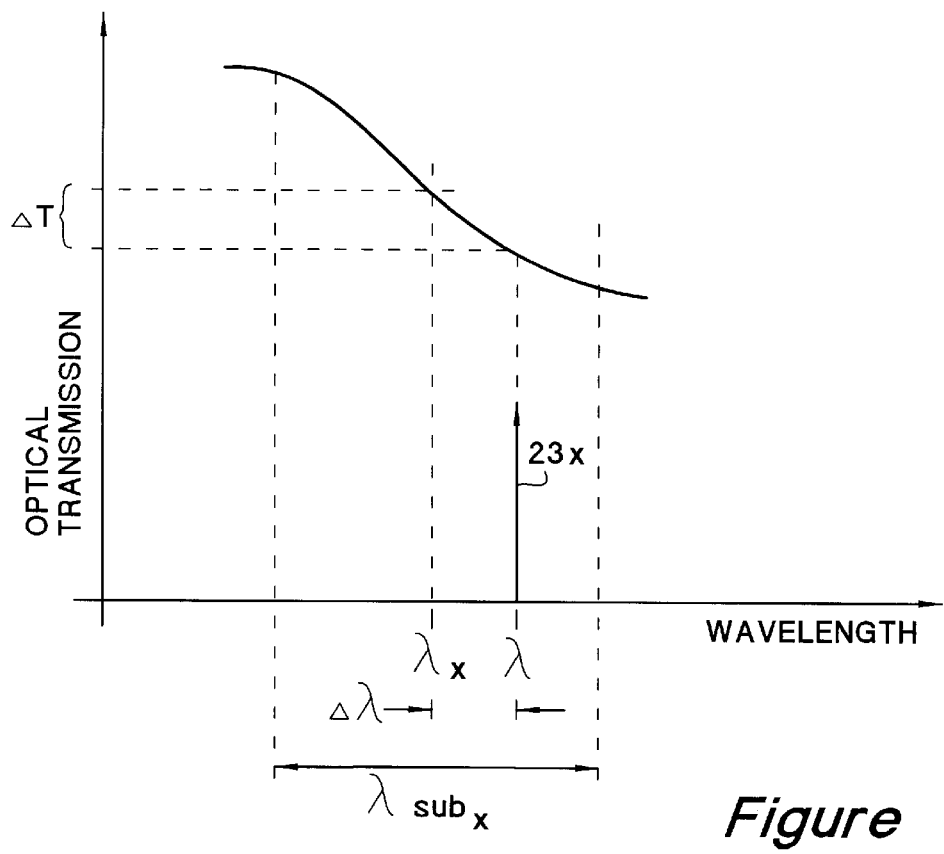
FIG. 3 shows optical transmission versus wavelength for a first wavelength discriminator included in the optical wavelength monitor of FIG. 2, constructed in accordance with a first preferred embodiment of the present invention.

FIG. 3 shows optical transmission versus wavelength for a first type of wavelength discriminator included in the optical wavelength monitor 20 constructed in accordance with a first preferred embodiment of the present invention. The optical transmission characteristic shown represents that of a typical one of the wavelength discriminators 22a–22h in this preferred embodiment. The optical transmission and optical reflection of each wavelength discriminator 22a–22h depends on the wavelength $\lambda$ of the component channel signal 23x. The component channel signals that have wavelengths lying outside a predetermined wavelength range $\lambda$SUBx of the particular wavelength discriminator are reflected by the wavelength discriminator and are directed to other wavelength discriminators in the series. Each wavelength discriminator 22a–22h has a predetermined wavelength range $\lambda$SUBx that includes the predefined channel wavelength $\lambda$x of the component channel signal 23x to be selectively transmitted by the wavelength discriminator. The particular channel signal 23x (representing a typical one of the component channel signals 23a–23h) that is within the predetermined wavelength range $\lambda$SUBx is selectively transmitted through the wavelength discriminator with optical transmission that depends on the wavelength deviation $\Delta\lambda$ of the channel signal 23x from the predefined channel wavelength $\lambda$x.

The wavelength discriminator produces a change in optical transmission $\Delta T$ that corresponds to the wavelength deviation $\Delta\lambda$. The wavelength discriminator shown in FIG. 3 has optical transmission that decreases monotonically as the wavelength of the channel signal 23x increases. Alternatively, the wavelength discriminator is constructed to provide optical transmission that increases monotonically as wavelength of the channel signal 23x increases.

The component channel signal 23x that is within the predetermined wavelength range $\lambda$SUBx is selectively transmitted through one of the wavelength discriminators 22a–22h which each produce one of the selectively transmitted channel signals 25a–25h. The selectively transmitted channel signals 25a–25h are each intercepted by one of the associated detectors 24a–24h. A frame 28 aligns the detectors 24a–24h with the selectively transmitted channel signals 25a–25h. Each detector generates an output current Ix (which represents one of the output currents Ia–Ih) that is responsive to the strength of the selectively transmitted channel signal incident on the detector. Since the strength of the selectively transmitted channel signals 25a–25h is effected by wavelength deviations $\Delta\lambda$ of the channel signals 23a–23h and by fluctuations in the power of the channel signals, the output currents Ia–Ih are normalized to the power of the component channel signals 23a–23h to enable wavelength deviations $\Delta\lambda$ of the channel signal 23x to be distinguished from fluctuations in the power of the channel signal 23x. The normalized output currents Ia–Ih of each of the detectors 24a–24h are mapped to corresponding signal wavelengths within the wavelength range $\lambda$SUBx of each of the wavelength discriminators 22a–22h.

The normalization is performed by applying a calibration signal from a tunable laser or other light source (not shown) to each of the wavelength discriminators 22a–22h. The wavelength of the calibration signal is held constant within each of the predefined wavelength ranges $\lambda$SUBx while the power of the calibration signal is varied over a predefined power range. The output current corresponding to each power level in the predefined power range is recorded.

The mapping is performed by applying a calibration signal to each of the wavelength discriminators 22a–22h. While the power of the calibration signal is held constant, the wavelength $\lambda$ of the calibration signal is swept within the predetermined wavelength range $\lambda$SUBx of the wavelength discriminator while the output current at each particular wavelength $\lambda$ of the signal is recorded. The mapping and normalization are performed for each of the wavelength discriminators 22a–22h and the associated detectors 24a–24h. Wavelength monitoring is performed by measuring the output currents Ia–Ih, monitoring power of each of the channel signals 23a–23h, normalizing the output currents Ia–Ih according to the power of the channel signal 23x by scaling the output currents Ia–Ih by the current corresponding to the monitored power of each channel signal 23a–23h and by using the mapping between the output current Ix and wavelength $\lambda$ to indicate the wavelength deviation $\Delta\lambda$ between the actual wavelength $\lambda$ of the channel signal 23x and the predefined channel wavelength $\lambda$x.

The wavelength discriminators 22a–22h formed in accordance with the first preferred embodiment of the present invention are filter skirts of Fabry-Perot filters or other types of filters constructed using known techniques. For example, the wavelength discriminator includes a layered structure deposited on a polished glass substrate or deposited directly onto the optically transmissive member 26. The structure includes a series of thin-film alternating layers of high refractive index material such as titanium dioxide (TiO2) having a refractive index of 2.235, and low refractive index material such as silicon dioxide (SiO2) having a refractive index of 1.44. The first layer, the thin-film layer adjacent to the glass substrate, is of the high refractive index material and there is a total of 70 layers. Each layer except for layer 18 and layer 53 have a quarter-wave optical thickness at the predefined channel wavelength $\lambda$x. Layer 18 has an optical thickness of 0.4998 at the predefined channel wavelength $\lambda$x and layer 53 has optical thickness of one-half at the wavelength of the predefined channel wavelength $\lambda$x.

One type of filter is described as an example of the wavelength discriminators 22a–22h used in the wavelength monitor 20. Other types of filters or optical elements can be constructed to provide selective optical transmission for component channel signals within each predetermined wavelength range $\lambda$SUBx and to reflect optical signals outside the predetermined wavelength range $\lambda$SUBx.

Figure 4:
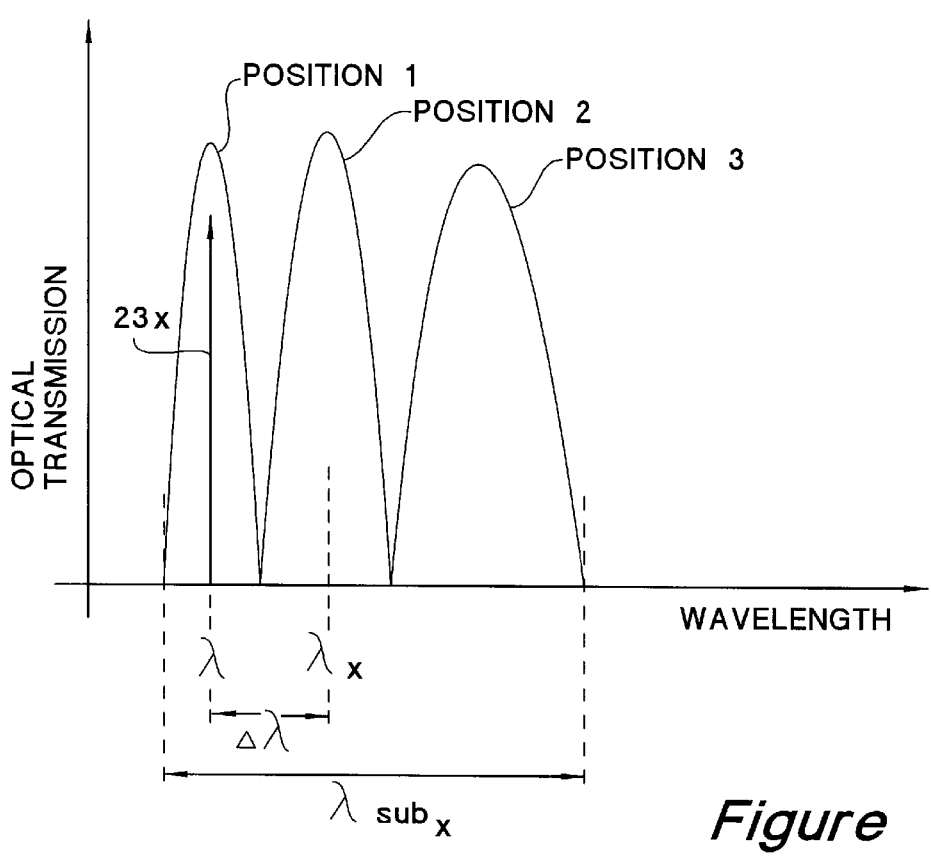
FIG. 4 shows optical transmission versus wavelength for a second wavelength discriminator included in the optical wavelength monitor of FIG. 2, constructed in accordance with a second preferred embodiment of the present invention.
Figure 5:
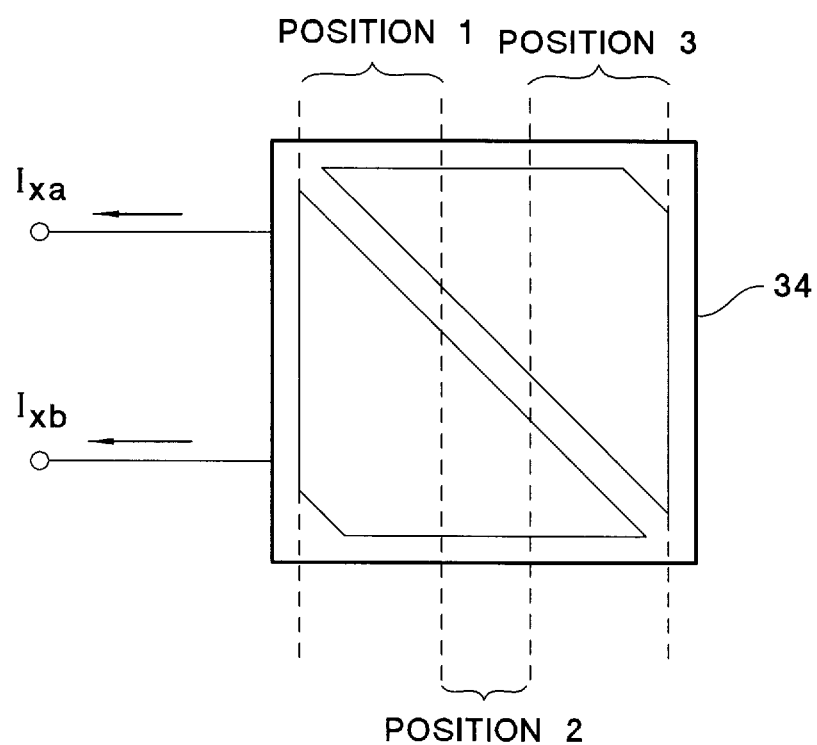
FIG. 5 shows a split-detector included in the optical wavelength monitor of FIG. 2, constructed in accordance with the second preferred embodiment of the present invention.

FIG. 4 shows optical transmission versus wavelength for a second type of wavelength discriminator, a dispersive element, used in the optical wavelength monitor 20 in accordance with a second preferred embodiment of the present invention. In this preferred embodiment, each one of the wavelength discriminators 22a–22h is implemented with a dispersive element that is used in conjunction with a split-detector 34x (shown in FIG. 5). In this preferred embodiment, the split-detector 34x represents a typical one of the detectors 24a–24h shown in FIG. 2. The selectively transmitted channel signal produced by the dispersive elements are dispersed signals. Each dispersive element maps an applied channel signal 23x within a predetermined wavelength range λSUBx to a spatial location within the physical spot size of the optical beam of the dispersed signal according to the wavelength λ of the channel signal 23x. Channel signals having wavelengths λ outside the predetermined wavelength range λSUBx are reflected by the dispersive element and are directed to the other dispersive elements that form the series of wavelength discriminators 22a–22h. The dispersed signal 25x from each dispersive element is incident on the split-detector 34x associated with the particular dispersive element. FIGS. 4 and 5 show the correspondence between wavelength λ of the component channel signal 23x applied to the dispersive element and the spatial location on associated split-detector 34x. Wavelength deviations Δλ of the incident channel signal 23x from the predefined channel wavelength λx are detected from the ratio of the output currents Ixa, Ixb produced by each half of the split-detector 34x.

The combined transfer function of the dispersive element and associated split-detector 34x is calibrated to map corresponding signal wavelength λ within the wavelength range λSUBx to a ratio of the output currents Ixa, Ixb. The mapping is performed by first applying to each of the dispersive elements a calibration signal from a tunable laser or other light source (not shown). The wavelength λ of the calibration signal is then swept within the predetermined wavelength range λSUBx while the ratio of the output currents Ixa, Ixb is recorded at each particular wavelength of the calibration signal. The mapping between the ratio of the output currents Ixa, Ixb and signal wavelength enables the wavelength λ of the applied channel signal 23x to be monitored. The mapping is performed for each of the dispersive elements forming the series of wavelength discriminators 22a–22h and each of the associated split-detectors.

The dispersive elements used to form the wavelength discriminators 22a–22h in accordance with the second preferred embodiment of the present invention are Fabry-Perot filters or other types of filters constructed using known techniques. For example, the dispersive element includes a layered structure having a series of thin-film alternating layers of high refractive index material such as titanium dioxide (TiO2) having a refractive index of 2.235, and low refractive index material such as silicon dioxide (SiO2) having a refractive index of 1.44, deposited on a polished glass substrate or deposited onto the optically transmissive member 26. The first layer, the thin-film layer adjacent to the glass substrate is of the high refractive index material and there is a total of 70 layers. Each of the layers has a tapered thickness that varies from one edge to the other edge of the dispersive element. The thinner edge of each of the alternating layers coincides with a common edge of the dispersive element so that the cross-section of the alternating layers is wedge-shaped. At the position of the dispersive element where the physical center of the optical beam of the applied channel signal is incident, each layer has a quarter-wave optical thickness at the predefined channel wavelength λx except for layer 18 and layer 53 which each have a half-wave optical thickness at the predefined channel wavelength λx.

As an example, a typical optical communication system provides to the wavelength monitor 20 a multi-wavelength light signal 21 having an optical beam diameter of 1 millimeter and a component channel spacing of 100 GHz. The predetermined wavelength range λSUBx may be selected to be 0.4 nanometers. Relative to the nominal optical thickness of each layer of the dispersive element at the physical center of the incident optical beam, the optical thickness varies across the width of the beam. At an offset of 0.5 mm in one direction from the center of the optical beam, the optical thickness of each layer in the dispersive element is a quarter-wave at a center wavelength equal to the predefined channel wavelength λx plus 0.2 nm, except layers 18 and 53 which are each a half-wave optical thickness at a center wavelength equal to the predefined channel wavelength λx plus 0.2 nm. At an offset of 0.5 mm in the opposite direction from the center of the optical beam, the optical thickness of each layer is a quarter-wave at a center wavelength equal to the predefined channel wavelength λx minus 0.2 nm, except layers 18 and 53 which are each a half-wave optical thickness at a center wavelength equal to the predefined channel wavelength λx minus 0.2 nm.

This filter description illustrates one example of a dispersive element used in the wavelength monitor 20. Other types of filters or optical elements can be constructed to selectively transmit optical signals within a predetermined wavelength range λSUBx and reflect optical signals outside the predetermined wavelength range λSUBx.

What is claimed is:

1. A wavelength monitor for channel signals having predefined channel wavelengths within a multi-wavelength light signal, comprising:

an optically transmissive member receiving the multi-wavelength light signal;

a series of wavelength discriminators, each wavelength discriminator in the series selectively transmitting a predetermined one of the channel signals according to the wavelength deviation of the predetermined channel signal from the predefined channel wavelength of the predetermined channel signal to produce a selectively transmitted signal, and reflecting the other of the channel signals, the series of wavelength discriminators arranged on the optically transmissive member to cascade the reflected channel signals to successive wavelength discriminators in the series; and a series of detectors, each detector in the series receiving the selectively transmitted signal from a corresponding one of the wavelength discriminators and producing an output signal responsive to the strength of the selectively transmitted signal, the output signal calibrated to indicate the wavelength deviation of the predetermined channel signal from the predefined wavelength of the predetermined channel signal.

2. The wavelength monitor of claim 1 wherein each wavelength discriminator includes an optical filter having optical transmission that varies monotonically according to wavelength deviation of a predetermined channel signal from the predefined wavelength of the predetermined channel signal within a predetermined wavelength range.

3. The wavelength monitor of claim 1 wherein each wavelength discriminator in the series of wavelength discriminators includes a dispersive element and each detector in the series of detectors includes a split-detector, each dispersive element illuminating a spatial position of the split-detector according to the wavelength deviation of the predetermined channel signal from the predefined wavelength of the predetermined channel signal within a predetermined wavelength range.

4. The wavelength monitor of claim 3 wherein each split-detector has two halves, each of the halves being illuminated equally by the received selectively transmitted signal when the wavelength of the predetermined channel signal is equal to the predefined wavelength.

5. The wavelength monitor of claim 4 wherein the two halves are illuminated unequally when the wavelength of the component signal deviates from the predefined wavelength.

6. A method of wavelength monitoring for channel signals within a multi-wavelength light signal, each channel signal having a predefined channel wavelength and an associated power, the method comprising the steps of:

receiving the multi-wavelength light signal;

cascading the multi-wavelength light signal between a series of wavelength discriminators;

selectively transmitting a predetermined one of the channel signals according to the wavelength deviation of the predetermined channel signal from the predefined wavelength of the predetermined channel signal at a corresponding one of the wavelength discriminators in the series;

reflecting the other of the channel signals at the corresponding one of the wavelength discriminators;

detecting the selectively transmitted channel signal and producing an output signal responsive to the selectively transmitted signal;

normalizing the output signal according to the power of the predetermined channel signal; and mapping the normalized output signal to wavelength deviations of the predetermined channel signal from the predefined wavelength.

7. The method of claim 6 wherein the step of selectively transmitting a predetermined one of the channel signals includes varying the optical transmission of the predetermined channel signal monotonically according to the wavelength deviation of the predetermined channel signal from the predefined wavelength of the predetermined channel signal and wherein the output signal is responsive to the strength of the selectively transmitted channel signal.

8. The method of claim 7 wherein the step of mapping the normalized output signal includes applying a calibration signal to each wavelength discriminator in the series, sweeping the wavelength of the calibration signal within a predetermined wavelength range, and recording the output signal at multiple wavelengths of the calibration signal.

9. The method of claim 6 wherein the step of selectively transmitting a predetermined one of the channel signals includes dispersing the predetermined one of the channel signals to a spatial location according to the wavelength deviation of the predetermined channel signal from the predefined wavelength of the predetermined channel signal.

10. The method of claim 9 wherein the output signal is responsive to the spatial location of the dispersed signal.

* * * * *